Nov. 11, 1930.                T. J. KING, JR                      1,781,181
                            WIRE TYING MACHINE
                        Filed Nov. 23, 1927       4 Sheets-Sheet 1

Witness:
F. Burkhardt

Inventor:
Thomas J. King, Jr.
By Cromwell, Greist & Warden

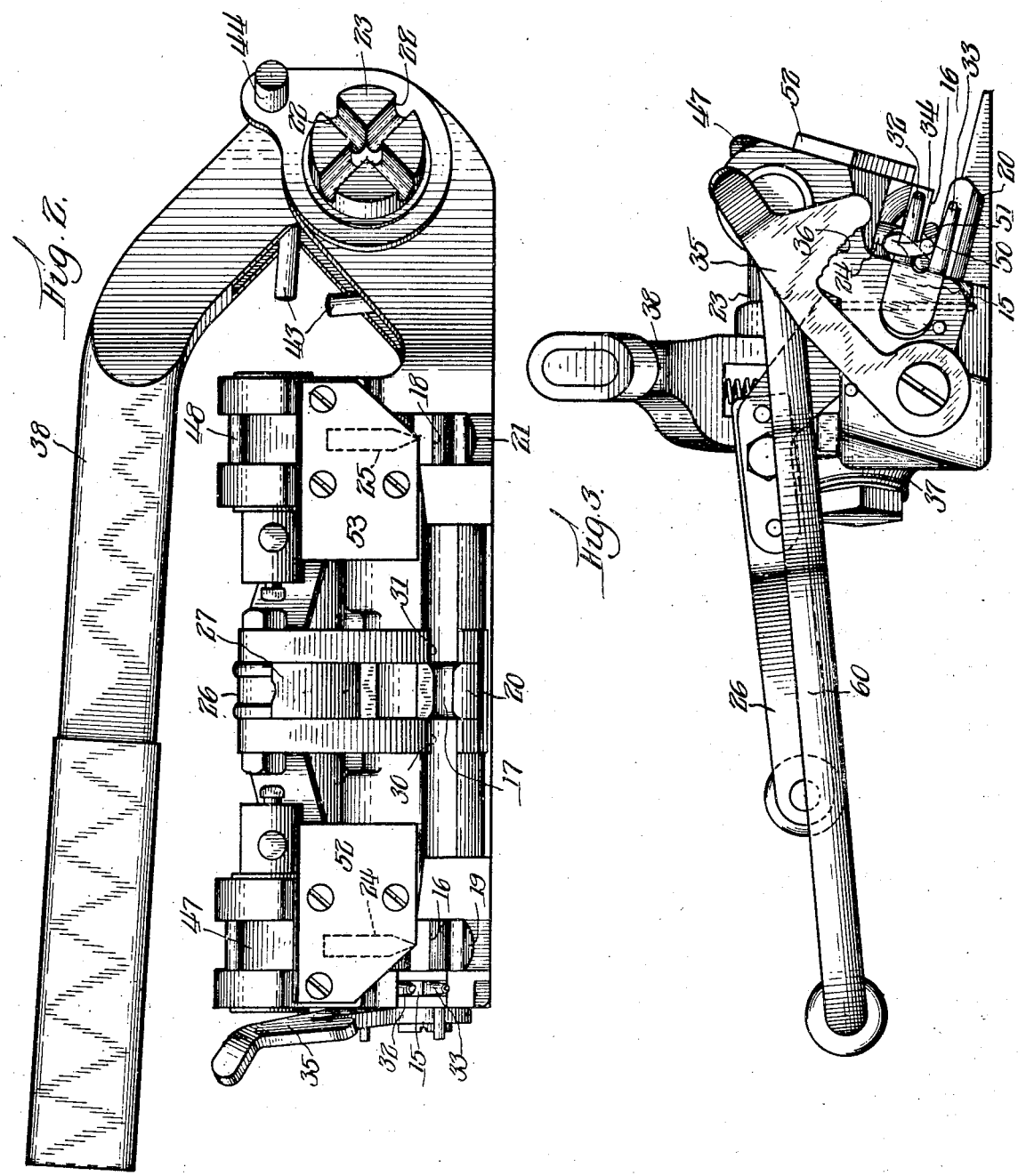

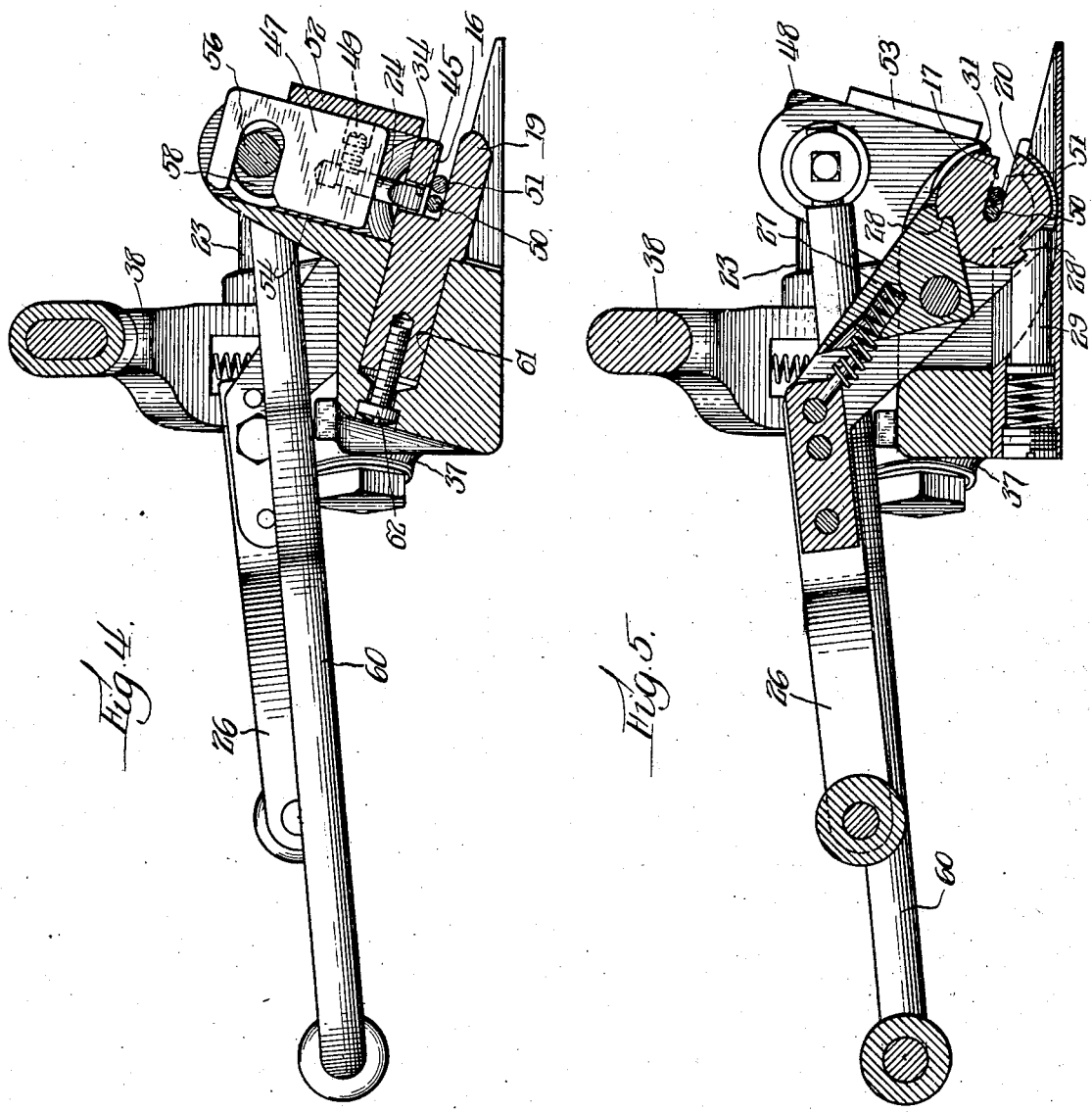

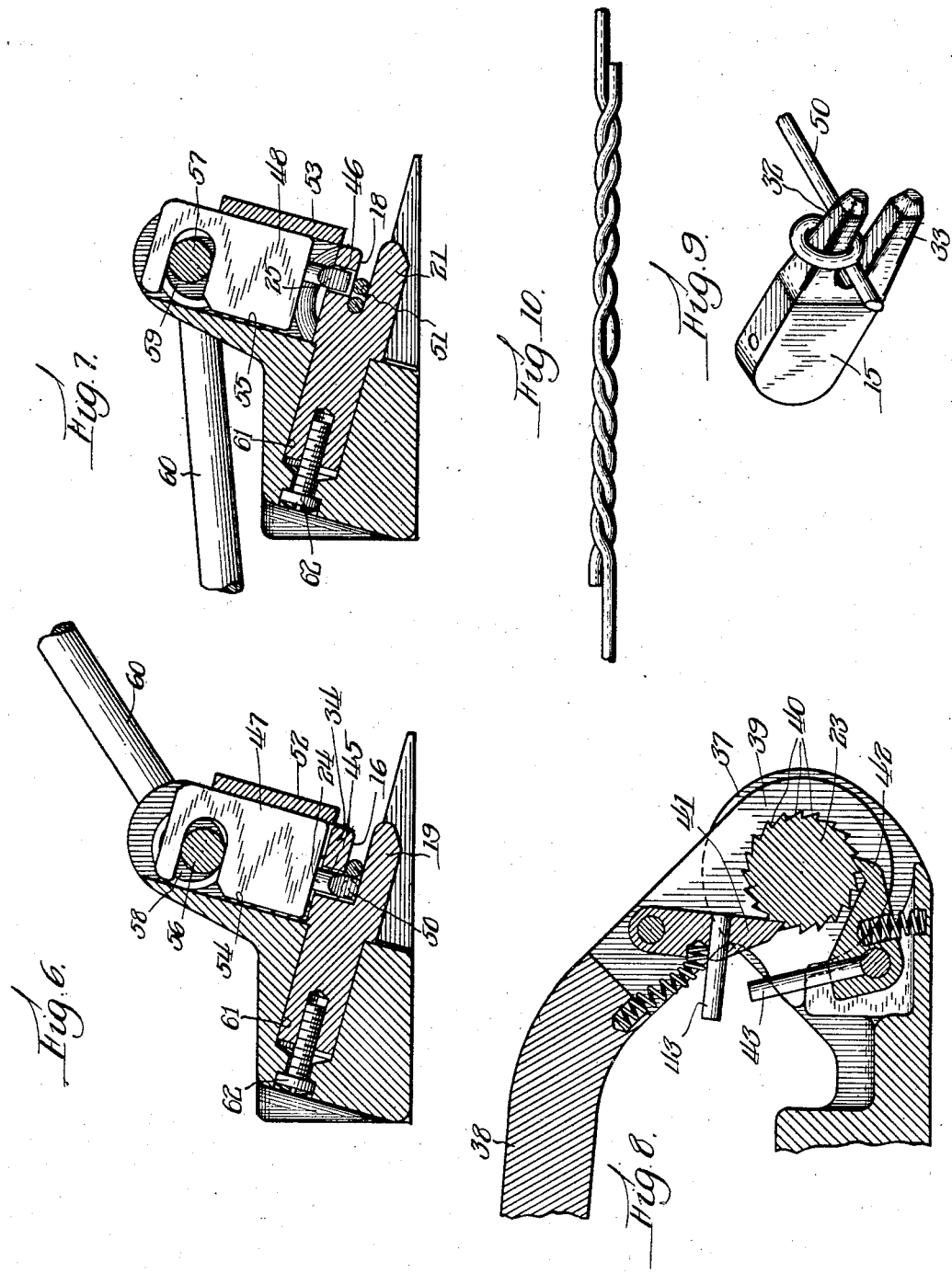

Patented Nov. 11, 1930

1,781,181

UNITED STATES PATENT OFFICE

THOMAS J. KING, JR., OF CHICAGO, ILLINOIS

WIRE-TYING MACHINE

Application filed November 23, 1927. Serial No. 235,135.

The present invention pertains to wire tying machines, and has for its object the provision of certain improvements which will serve to increase the efficiency of such machines.

One improvement consists in arranging the tensioning ratchet at an angle to the longitudinal axis of the machine, whereby to cause the lapped ends of the wire to be drawn laterally during the tensioning operation into proper position with respect to other portions of the machine. Another improvement consists in employing chisel-like implements to cut off the ends of the wire, and in effecting the cutting operation with such implements against the bottom faces of the grippers rather than along the side edges of the same. Still another improvement consists in forming the stationary end of the wire into a small loop, and in providing a holding finger over which the loop may be easily slipped.

While the foregoing statements are indicative in a general way of the nature of the invention, other improvements will be recognized by those skilled in the art upon a full understanding of the construction, arrangement and operation of a machine embodying the invention. Such a machine is presented herein for the purpose of exemplification, but it will of course be understood that the invention is susceptible of embodiment in other structurally modified forms coming equally within the scope of the appended claims.

In the accompanying drawings:

Fig. 2 is a front view;

Fig. 3 is an end view;

Fig. 4 is a transverse section, taken on the line 4—4 of Fig. 1, showing the left hand cutter before the cutting operation;

Fig. 5 is a transverse section, taken on the line 5—5 of Fig. 1;

Fig. 6 is a transverse section, taken on the line 4—4 of Fig. 1, but showing the left hand cutter after the cutting operation;

Fig. 7 is a transverse section, taken on the line 7—7 of Fig. 1, showing the right hand cutter after the cutting operation;

Fig. 8 is a longitudinal section, taken on the line 8—8 of Fig. 1;

Fig. 9 is a perspective view of the holding finger, showing the stationary end of the wire looped and applied to the same; and Fig. 10 is a view of the tie produced by the machine.

Figure 1:
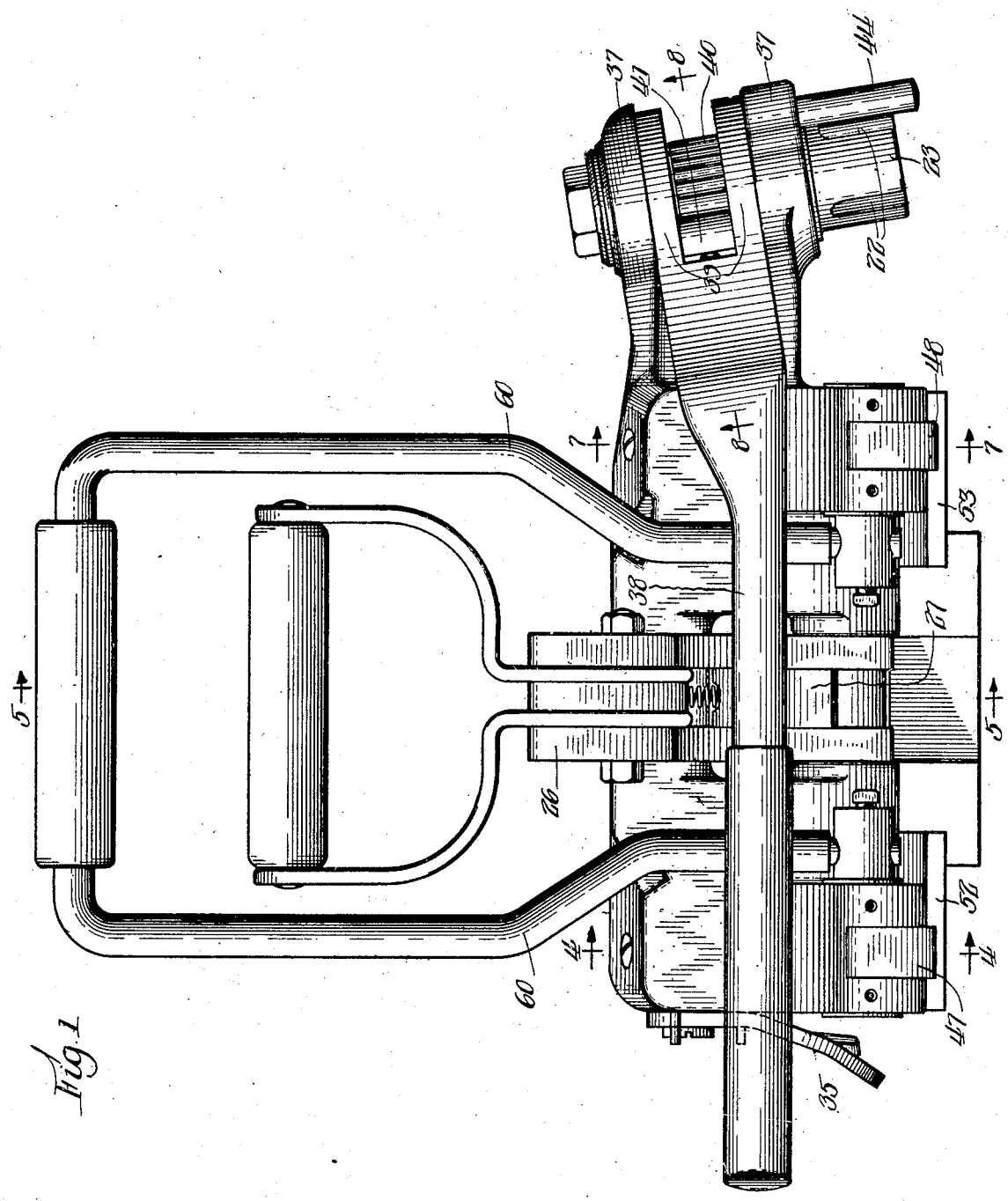
Fig. 1 is a plan view of a machine embodying the invention.

The machine illustrated in the drawings is adapted to be used in tying heavy round wire about boxes, bales, bundles and the like. In preparing to operate the machine, one end of the wire to be tied—hereinafter referred to as the "stationary" end—is looped over a holding member 15 and inserted in aligned slots 16, 17 and 18 formed in a gripping member 19, a twisting member 20 and another gripping member 21; and the other end of the wire—hereinafter referred to as the "movable" end—is passed around the object, inserted in the same slots as the stationary end in lapped relation to the same, and lodged in a slot 22 formed in a tensioning member 23. The first operation of the machine, after the wire has been positioned in the manner above described, is the tensioning of the wire, which is accomplished by rotating the member 23. The next operation is the twisting together of the ends of the wire, which is accomplished by rotating the member 20. The next and last operation is the cutting off of the ends of the wire beyond the tie, which is accomplished by moving two cutting members 24 and 25 through the portions of the slots in the gripping members occupied by the ends to be cut.

The slots 16, 17 and 18 which are formed in the gripping member 19, the twisting member 20 and the gripping member 21 are arranged at a slight inclination (see Fig. 3) in order to permit the machine to be withdrawn easily from the wire after the tie has been formed. The slots are of sufficient depth to accommodate both ends of the wire in lapped relation, but are not wide enough to permit such ends to pass each other, with the result that, when the twisting member is turned, the portions of the ends of the wire positioned in the slot 17 in the twisting member are caused to turn relative to the portions of the ends held in the slots 16 and 18 in the gripping members, and a strong double twist is produced. The twisting member 20 is journaled in the frame of the machine, and is rotated by means of a hand lever 26, which lever is journaled on reduced end portions of the member 20 and has a U-shaped spade-grip handle portion. The lever 26 is provided with a spring pressed pawl 27 (see Fig. 7) which is pivoted to the lever and engages with one of three ratchet teeth 28 in the periphery of the member 20. The pawl 27 causes the member 20 to move through one-third of a revolution upon each forward stroke of the lever 26. Upon each return stroke of the lever, the member 20 is prevented from turning backward by a spring-pressed plunger 29 which slides in a guideway in the frame of the machine and engages with another of the ratchet teeth 28 in the periphery of the member. In producing the particular tie shown in Fig. 10, nine strokes of the lever 26 are required. The portion of the lever 26 adjacent the member 20 is bifurcated, and the bifurcations are provided with slots 30 and 31 which normally register with the slot 17 in the member.

The holding member 15 is pivoted to the frame of the machine on a vertical axis and is provided with two fingers 32 and 33 which are arranged at the same inclination as the slots 16, 17 and 18. One finger 32 is positioned a short distance above the level of such slots, while the other finger 33 is positioned a corresponding distance below the same. The loop in the stationary end of the wire need only slip over one of the two fingers, but, inasmuch as the position of the loop may be either up or down, the provision of two fingers instead of one makes it unnecessary to reverse the position of the wire, the finger found to be in the most convenient location being used. When the wire becomes taut during the tensioning operation, the loop draws the member 15 toward the adjacent side 34 of the gripping member 16, and the finger encircled by the loop serves to clamp the wire against such side. Any tendency of the loop to open up under added tension is effectively checked by the other finger as soon as the end of the loop moves into engagement with the same. A hook 35 is pivoted to the frame of the machine behind the member 15 for preventing the lapped ends of the wire from working out of the slots 16, 17 and 18 during the tensioning, twisting and cutting operations. The hook is provided with a serrated surface 36 which is made eccentric with respect to the pivotal axis of the hook in order to permit the hook to wedge the ends of the wire snugly into the ends of the slots even though the wire used in the machine is sometimes of one size and sometimes of another.

The tensioning member 23 is journaled in an extension 37 of the frame of the machine, and is rotated by means of a hand lever 38, which lever has spaced portions 39 which are journaled on the stem of the member 23 at opposite sides of ratchet teeth 40 (see Fig. 8) formed on the stem. The lever 38 is provided with a spring-pressed pawl 41 which is pivoted to the lever and engages with one of the ratchet teeth. The pawl 41 causes the member 23 to turn through a part of a revolution upon each stroke of the lever 38. Upon each return stroke of the lever, the member 23 is prevented from turning backward by another spring-pressed pawl 42 which is pivoted to the extension 37 of the frame and engages with another of the ratchet teeth 40. The pawls 41 and 42 are provided with small handles 43 by means of which the pawls may be moved into inoperative positions should occasion require. As soon as rotation of the member 23 commences, the movable end of the wire, which is inserted in one of the slots 22 in the member 23, is reversely bent and locked against the face of the member by means of a pin 44 which projects from the extension 37 on the frame in a position closely adjacent the face of the member. The member 23 is set at an angle to the longitudinal axis of the machine (see Fig. 1), with the result that when the member is rotated, with the movable end of the wire to be tied in position in one of the slots 22, such end, in being forced to bend about and wind on the face of the member, is drawn laterally by the member, causing both of the ends of the wire in the slots 16, 17 and 18 to be forced tightly against the closed ends of the slots. This insures proper positioning of the ends in the slots during both the subsequently performed twisting and cutting operations.

The cutting members 24 and 25 are two chisel-shaped cutters (see Figs. 4, 6 and 7) which are positioned in apertures 45 and 46 formed in the gripping members 19 and 21 above the slots 16 and 18. The cutters are arranged with their axes perpendicular to the axes of the slots, and are reciprocated into and out of the slots by means of blocks 47 and 48, the upper ends of the cutters being seated in recesses in the blocks and held therein by set screws 49. The cutter 24 passes through the back end of the slot 16 in the member 19, whereby to sever the stationary end of the wire without affecting the portion of the movable end alongside the same, while the cutter 25 passes through the slot 18 at a point spaced from the closed end of the same, whereby to sever the movable end of the wire without affecting the portion of the stationary end alongside the same. The apertures 45 and 46 in the members 19 and 21 are located intermediate the vertical side faces of such members, with the result that the cutters are caused to move against the bottom faces 50 and 51 of the slots 16 and 18 in severing the ends of the wire. When the cutters 24 and 25 become dull, they may be easily replaced by removing plates 52 and 53 which form the front sides of guideways 54 and 55 in which the blocks 47 and 48 reciprocate. The blocks 47 and 48 are notched adjacent their upper ends and receive eccentrics 56 and 57 which are formed on the pivoted ends 58 and 59 of a U-shaped handle 60. The handle 60 is longer and wider than the hand lever 26, and the hand-grip portions of both are arranged in closely spaced parallel relation to each other whereby the two together constitute a convenient carrying handle for the machine. When the handle 60 is in the position shown in all views but Fig. 6, the cutters 24 and 25 are in raised position, and when the handle 60 is swung forwardly into the position shown in Fig. 6, the cutters are in lowered position. By having the cutters 24 and 25 sever the ends of the wire against the bottom faces 50 and 51 of the slots, instead of having them shear the ends across the side edges of the slots, it is possible to have such side edges rounded slightly, which rounding will produce a much stronger tie, since sharp edges on the holding members tend to weaken the wire at the points where the wire engages with such edges while being twisted.

The gripping members 19 and 21 are preferably adjustable in the direction of the slots 16 and 17, the adjustment being effected by positioning the members in recesses 61 in the base (see Figs. 4, 6 and 7), and securing them in any desired position by means of screws 62 which draw the members tight either against the rear ends of the recesses or against spacing washers of suitable thickness inserted behind the rear ends of the members in the recesses. The purpose in having the members adjustable is to permit the machine to be used with wire of different gauges. If small gauge wire were used and no compensation made in the machine for the same, the cutter designed to sever only the inside wire would be likely to sever both wires, while the cutter designed to sever only the outside wire would be likely to miss or only partially cut the same. By moving out the members 19 and 21 when small gauge wire is used, the ends of the slots are brought nearer the cutters and this difficulty is overcome.

I claim:

1. In a wire tying machine, in combination, a twisting device having a plurality of aligned slots therein for the reception of two lapped ends of a wire, and a tensioning ratchet having a slot therein for the reception of one of the ends, said ratchet being rotatable to tension the wire and being canted with respect to the line of slots in the twisting device whereby to cause the ends to move into the slots as far as possible upon rotation of the ratchet.

2. In a wire tying machine, in combination, a rotatable member for twisting together two lapped ends of a wire, and another rotatable member for pulling one end of the wire prior to the operation of the twisting member whereby to tension the wire, said tensioning member being canted with respect to the twisting member whereby to move the end of the wire engaged by the same laterally into proper position with respect to the twisting member.

3. In a wire tying machine, in combination, a twisting member, two gripping members arranged at opposite sides of the twisting member, and a cutting member arranged to cut against the wire-supporting face of one of the gripping members intermediate the side edges of the latter.

4. In a wire tying machine, in combination, a twisting member, two gripping members arranged at opposite sides of the twisting member, and two cutting members arranged to cut against the wire-supporting faces of the gripping members intermediate the side edges of the latter.

5. In a wire tying machine, in combination, a slotted twisting member, two slotted gripping members arranged at opposite sides of the twisting member, and a chisel-shaped cutting member arranged to cut against the bottom face of the slot in one of the gripping members at a point intermediate the side edges of such face.

6. In a wire tying machine, in combination, a slotted twisting member, two slotted gripping members arranged at opposite sides of the twisting member, two chisel-shaped cutting members positioned perpendicularly with respect to the slots in the gripping members and arranged to cut against the bottom faces of the slots at points intermediate the side edges of such faces, and means for reciprocating the cutting members into and out of the slots.

7. In a wire tying machine, in combination, a slotted twisting member, two slotted gripping members positioned at opposite sides of the twisting member, two chisel-shaped cutting members extending downwardly through apertures in the gripping members into the slots in the latter, and two reciprocally mounted blocks to which the cutting members are detachably secured.

8. In a wire tying machine, in combination, a slotted twisting member, two slotted gripping members positioned at opposite sides of the twisting member, two chisel-shaped cutting members extending downwardly through apertures in the gripping members into the slots in the latter, and two reciprocally mounted blocks to which the cutting members are detachably secured, said blocks being readily removable from the machine to permit the cutting members to be detached therefrom and replaced.

9. In a wire tying machine, in combination, means for pulling one end of the wire to be twisted, a pivoted finger over which a loop in the other end of the wire is adapted to be slipped, and an abutment on the machine for limiting the pivotal movement of the finger in one direction to a position substantially at right angles with the wire.

10. In a wire tying machine, in combination, means for pulling one end of the wire to be twisted, a finger over which a loop in the other end of the wire is adapted to be slipped, and a hook for holding the loop on the finger.

11. In a wire tying machine, in combination, means for pulling one end of the wire to be twisted, a pivoted finger over which a loop in the other end of the wire is adapted to be slipped, an abutment on the machine for limiting the pivotal movement of the finger in one direction to a position substantially at right angles with the wire, and a pivoted hook having a serrated face eccentric to its pivotal axis for engaging with the wire adjacent the loop and holding the loop on the finger.

12. In a wire tying machine, in combination, means for pulling one end of the wire to be twisted, and a holding member having two spaced fingers over either of which a loop in the other end of the wire is adapted to be slipped.

13. In a wire tying machine, in combination, means for pulling one end of the wire to be twisted, a member having a slot through which the wire is adapted to be pulled, and a pivoted holding member alongside such slotted member having two parallel fingers arranged above and below such slot over either of which fingers an offset loop in the other end of the wire is adapted to be slipped.

14. In a wire tying machine, in combination, a slotted twisting member for the reception of two strands of wire, two slotted gripping members arranged at opposite sides of the twisting members for the reception of such strands, a cutting member associated with one of the gripping members for severing one of the strands, and means for adjusting the gripping member with which the cutting member is associated in the direction of the slot therein whereby to vary the position of the slot in that gripping member relative to the cutting member and thus compensate for wires of different gauges.

15. In a wire-tying machine, in combination, a twisting device having a plurality of aligned slots therein for the reception of two lapped ends of a wire, and a tensioning post having a cylindrical winding surface and a slot therein for the reception of one of the ends, said post being rotatable to wind the end of the wire in the slot therein about the cylindrical surface thereof under tension and being arranged with its axis canted in such direction with respect to the line of slots in the twisting device as to cause the ends to move into the slots as far as possible upon rotation of the post.

16. In a wire-tying machine, in combination, a slotted twisting member, two slotted gripping members positioned at opposite sides of the twisting member, two cutting members extending downwardly through apertures in the gripping members into the the slots in the latter, two reciprocally mounted blocks to which the cutting members are detachably secured, two axially aligned trunnions journaled adjacent the blocks, eccentrically disposed formations on the trunnions positioned in laterally extending notches in the blocks, and a U-shaped handle connecting the trunnions to oscillate the same whereby to cause the blocks with the cutting members to move up and down.

17. In a wire-tying machine, in combination, a slotted twisting member, two slotted gripping members positioned at opposite sides of the twisting member, two blocks reciprocally mounted in forwardly opening guideways above the slots in the gripping members, two cutting members detachably secured to and projecting downwardly from said blocks through apertures in the gripping members into the slots in the latter, means for reciprocating the blocks, laterally separable connections between said means and the blocks, and readily removable means forming the front walls of the guideways for the blocks.

18. In a wire-tying machine, in combination, a slotted twisting member, two slotted gripping members positioned at opposite sides of the twisting member, two blocks reciprocally mounted in forwardly opening guideways above the slots in the gripping members, two chisel-shaped cutting members detachably secured to and projecting downwardly from said blocks through apertures in the gripping members into and intermediate the side edges of the slots in the latter, two axially aligned trunnions journaled adjacent the blocks, eccentrics on the trunnions positioned in laterally extending notches in the blocks, means for oscillating the shaft to cause the blocks with the cutting members to move up and down, and two plates detachably secured in such positions as to form the front walls of the forwardly opening guideways for the blocks.

19. In a wire-tying machine, in combination, a twisting device having a plurality of aligned slots therein for the reception of two lapped ends of a wire, and a tensioning head having a curved winding surface and a slot for the reception of one of the ends, said head being rotatable to wind the end of the wire in the slot about the curved surface thereof under tension and being arranged with its axis in rearwardly converging relation to a line perpendicular to the line of slots in the twisting device to tend to draw the ends of the wires farther into the slots upon rotation of the head.

20. In a wire-tying machine, a twisting device, and means for tensioning the wire prior to the twisting operation comprising a rotatable member upon which one end of the wire is adapted to be wound, a hand lever for rotating said member in one direction to tension the wire, means for normally preventing rotation of the member in the opposite direction, and a finger piece connected with said last mentioned means for moving the same into an inoperative position to allow the tension on the wire to be relieved.

21. In a wire-tying machine, a twisting device, an independently operated cutting device, and two U-shaped operating levers for said devices arranged one within the other with the hand-grip portions thereof in spaced parallel relation to each other.

22. In a wire-tying machine, a slotted twisting member, two slotted gripping members arranged at opposite sides of the twisting member, a cutting member for severing one of the wires passing through one of the slots in the gripping members, and means for affecting a change in the relative positions between the cutting member and the back of the slot.

23. In a wire-tying machine, a slotted twisting member, and two slotted gripping members arranged at opposite sides of the twisting member with the adjacent edges of the slots in the gripping members rounded to prevent sharp weakening bends in the wire at the ends of the twisted section.

In witness whereof I have hereunto subscribed my name.

THOMAS J. KING, Jr.